United States Patent [19]
Kitchen

[11] Patent Number: 5,446,508
[45] Date of Patent: Aug. 29, 1995

[54] PROGRESSIVE POWER LENS

[75] Inventor: George A. Kitchen, Plantation, Fla.

[73] Assignee: BMC Industries, Inc., Minneapolis, Minn.

[21] Appl. No.: 198,059

[22] Filed: Feb. 18, 1994

[51] Int. Cl.⁶ ................................................. G02C 7/06
[52] U.S. Cl. .................................................... 351/169
[58] Field of Search ............... 351/168, 169, 170, 171, 351/172

[56] References Cited

U.S. PATENT DOCUMENTS

| | | |
|---|---|---|
| 4,307,945 | 12/1981 | Kitchen et al. .................. 351/169 |
| 4,426,139 | 1/1984 | van Ligten et al. ............... 351/169 |
| 4,472,036 | 9/1984 | Kitani ............................. 351/169 |

*Primary Examiner*—Scott J. Sugarman
*Attorney, Agent, or Firm*—Kinney & Lange

[57] ABSTRACT

The present includes a progressively variable focal power ophthalmic lens that has a unique geometry which significantly reduces aberrations in the lens. The aberrations are reduced by altering the traditional geometry associated with peripheral areas of the lens from a spherical shape to an aspherical shape. Still another advantage of the lens geometry of the present invention is that the aberrations remain low after the lens is rotated to accommodate the left or right eye.

6 Claims, 4 Drawing Sheets

PROGRESSIVE POWER LENS

BACKGROUND OF THE INVENTION

The present invention relates to the field of ophthalmic lenses. More particularly, the present invention relates to ophthalmic lens having a progressively varying focal power.

Middle age people frequently experience an inability to sharply focus when viewing close objects. This condition is called presbyopia and it results from a reduced or defective elasticity of the eye.

People suffering from presbyopia are typically prescribed multi-focal ophthalmic lenses having two or more spherical surfaces of different refractive power. These lenses are designed such that the power of one surface will permit proper focusing on nearby objects while the other surface or surfaces enable the wearer to focus objects at greater distances. A person suffering from presbyopia will initially wear lenses having two segments, known as bifocals. Later, as the eye further deteriorates, the person may require lens having three segments, called trifocals, to assist in focusing on objects at intermediate distances Multi-focal lenses have been in use for great many years and are generally quite acceptable insofar as their ability to provide improved vision. There are several drawbacks of multi-focal lenses. For example, conventional multi-focal lenses have a sharp dividing line between the segments of the lens. As a result of the sharp dividing line, a person wearing the multi-focal lenses perceives a jump when scanning across the discontinuity. For many wearers, it is difficult to adjust to this sensation.

It is also for common for middle age people to experience an inability to clearly focus on objects that lie between those distances for which the various segments of the lens are designed to focus. This condition is referred to as having a reduced power of accommodation.

Finally, many people having reduced accommodation powers are hesitant to wear multi-focal lenses because of their belief that it detracts from their appearance and suggests to others that they are growing old. Although these people may require corrective spectacles, they will not regularly wear them, and thus are not only sacrificing good vision but are also creating a safety problem as, for example, driving without proper glasses.

Recognizing the inadequacies of conventional multi-focal lenses, progressively variable focal power lenses were developed. These lenses, which are also called progressive power lenses, are designed to provide multi-focal lens characteristics without any sharp discontinuity between the various portions of the lens. Specifically, progressive power lenses have a progressive power portion positioned between and merging into the distance and reading portions of the lens. Furthermore, the progressive portion is designed to have a continuously varying focal power beginning with a focal power equal to that of the distance portion where it merges with the distance portion and ending with a focal power equal to that of the reading portion where it merges into the reading portion.

The distance, reading, and progressive powers portions constitute the functional zone of the lens. The remaining area of the lens constitutes the peripheral zone, which does not provide proper corrective power for the wearer. The peripheral zone typically contains aberrations that interfere a wearer's comfort.

The basic patent for this type of lens was issued in 1915 (U.S. Pat. No. 1,143,316) and a more refined version was issued in 1924 (U.S. Pat. No. 1,518,405). These patents primarily related to the functional zone of the lens. Numerous patents have subsequently issued that provide different formulations for the peripheral zone, aiming at reducing aberrations or relating to manufacturing methods or both.

Two aberrations in the peripheral zone that have a major impact on the wearer's comfort are astigmatism and distortion of horizontal and vertical lines. The physical and mathematical properties of these aberrations are well understood by those skilled in this field, and it is recognized that due to physical requirements which have to be fulfilled in the functional zone, these aberrations cannot be eliminated. This limits the design objective to the development of a surface geometry having particular distribution of aberrations in the peripheral zone so as to provide the best possible comfort to the wearer.

Particularly disturbing is the distortion of horizontal and vertical lines in the peripheral zone. Also, the unavoidable astigmatism aberration is particularly offending in the zone adjacent to the distance portion as it affects the near peripheral vision during distance viewing. Another undesirable place for this aberration is the lowest portion of the peripheral zone because it tends to distort true ground level perception. Typically, the more recent U.S. patents, such as U.S. Pat. Nos. 3,687,528, 3,2910,691, 4,055,379; and 4,062,629, describe the lenses that are all aimed at providing the best solution for the above described conditions.

Another patent that addresses reduction of aberrations is Kitchen et al., U.S. Pat. No. 4,307,945. The Kitchen et al. lens exhibits many improvements over prior art lenses. The lens reduces distortion of horizontal and vertical lines in the temporal peripheral zone below detectable levels. The lens also reduces the astigmatic aberration in the area adjacent to the distance portion. In addition, the lens significantly reduces astigmatic aberration in the lower part of the temporal peripheral zone. The design of the lens also allows the above described benefits to be retained when the lens is rotated to accommodate the left or right eye.

SUMMARY OF THE INVENTION

The present invention includes a progressively variable focal power lens. The progressive power lens has a surface that includes a distance portion, a reading portion, a progressive power portion, and peripheral zones. At least a portion of the surface can be defined in parametric form with reference to three-dimensional coordinate system in which an origin of the coordinate system is at a vertex of the lens surface. The z axis is perpendicular to the lens surface at the vertex. The x axis is vertical relative to the lens surface. The y axis is horizontal relative to the lens surface. Each cross-section of the portion parallel to the y-z plane is defined as a two-dimensional curve having a central portion defined by a parametric function $Z_{m(x,y)}$ and peripheral zones defined by a function $Z_{n(x,y)}$ and wherein:

$$Z_{m(x,y)} = Z_{mo(x)} + \frac{1}{B(x)} ( \sqrt{ \rho_{(x)}^2 + B(x) y^2 } - \rho_{(x)} ) -$$

-continued $$\frac{1}{N_{(x)}} C_{(x)} Y^{N_{(x)}}$$

and $$Z_{n(x,y)} = Z_{no(x)} + R_{(x)} - \sqrt{R_{(x)}^2 - Y^2} \; A_{(x)} Y^{L_{(x)}}$$

where:

$Z_{mo(x)}$ is a function that describes the geometry of an umbilical line of the lens surface;

$B_{(x)}$ is a conic constant for a conic component of the function;

$\rho_{(x)}$ is an y-z component of local radius of curvature $R_{m(x)}$ of the umbilical line defined by the function $Z_{mo(x)}$;

$C_{(x)}$ and $N_{(x)}$ are dependent functions that provide a smooth tangent point of intersection between $Z_{m(x,y)}$ and $Z_{n(x,y)}$;

$Z_{no(x)}$ is a function that is:

similar to $Z_{mo(x)}$ in the bottom half of the lens surface but includes constants that control the intersection of $Z_{m(x,y)}$ and $Z_{n(x,y)}$ and, therefore, the width of the reading portion;

$$R_B - \sqrt{R_B^2 - X^2}$$

in the top half of the lens, where $R_B$ is the base curve radius of the surface;

$R_{(x)}$ is a distance between a point $x_1y_1$ and a line parallel to the x axis and intersecting a center of the distance portion;

$A_{(x)} Y^{L_{(x)}}$ is a function that reduces the astigmatism in the lens periphery just below center and to reduce the maximum astigmatism;

$A_{(x)}$ is a function that is small in order that suppresses the contribution of the $A_{(x)} Y^{L_{(x)}}$ component in the central portion of the curve;

$L_{(x)}$ is selected to minimize and balance astigmatism in the lens. In the areas where Y equals approximately 18 to 23 millimeters, $Z_{n(x,y)}$ becomes a circle of the same radius and slope as the central curve at that point.

DETAILED DESCRIPTION OF THE PREFERRED EMBODIMENTS

Figure 1:
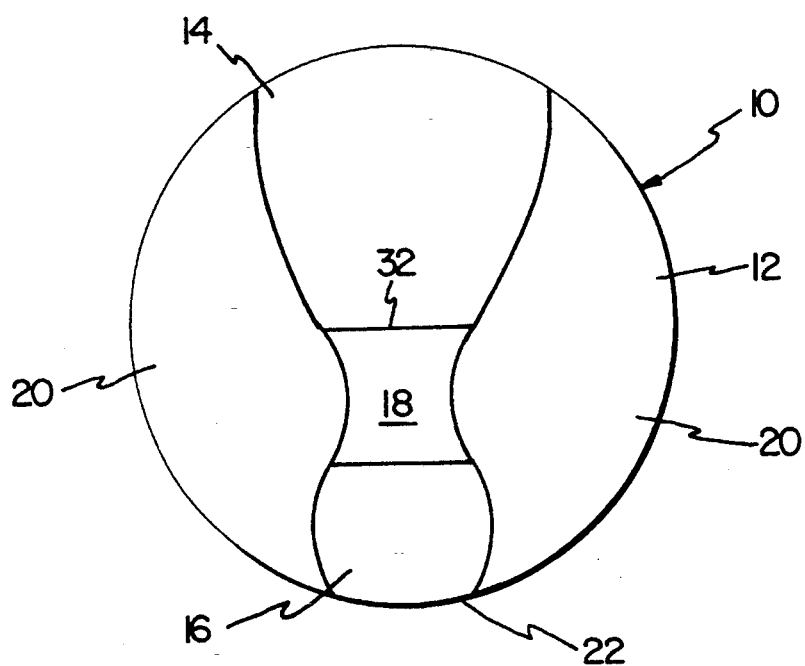
FIG. 1 is a sectional view of a progressive lens surface according to the present invention.

An ophthalmic progressive power lens of the present invention is generally indicated at 10 in FIG. 1. The lens 10 includes a front convex surface 12. Although the lens 10 is not physically divided into distinct portions, the lens 10 is divided into four sections to assist in describing the present invention. The sections of the lens 10 are distance portion 14, reading portion 16, progressive portion 18 and peripheral zones 20.

The distance portion 14 occupies a central area of a top half of the lens 10. Preferably, the distance portion 14 is of a spherical curvature and has a constant dioptric power throughout. The distance portion 14 is useful for viewing objects that are located at a distance.

The reading portion 16 is located near a lower edge 22 of the lens. Like the distance portion 14, the reading portion preferable has a spherical curvature and has a constant dioptric power. The reading portion 16 is used for viewing objects at normal reading distances.

The progressive portion 18 is located between and optically connects the distance portion 14 and the reading portion 16. As is known in the art, and as will be discussed more fully hereinafter, progressive portion 18 includes a corridor that extends from the distance portion 14 to the reading portion 16. The corridor gradually and continuously changes in power from a power equal to that of the distance portion 14 where the progressive portion 18 joins the distance portion 14 to that of the reading portion 16 where the progressive portion 18 joins the reading portion 16.

The progressive portion 18 enables a person to clearly view objects placed at any distance between infinity and the reading distance. It is highly desirable that the progressive portion 18 be free from astigmatic power difference along its entire length.

As indicated previously, the distance portion 14, the reading portion 16, and the progressive portion 18 constitute the functional zone of the lens, which provides corrective optical powers defined by prescription. The remainder of the lens, identified by reference numeral 20, constitutes the peripheral zones of the lens surface 12. The function of the peripheral zones 20 is to fill out the remaining area of the lens so that a continuous optical surface is formed. As will become apparent hereinafter, it is in the peripheral zones 20 that aberrations are, of necessity, present, and where the present invention is primarily directed in order to provide a lens of optimal characteristics throughout.

As described above, the lens, although being divided into four areas for purposes of this description, is a continuous surface that gradually blends the various portions together. Accordingly, as the eye scans across the lens, for example, from the reading portion 16 to the progressive portion 18 or from the progressive portion 18 to the peripheral zones 20, the wearer will not be able to readily discern any precise area or line where the change from one portion to the other took place.

It should also be understood that the present invention is concerned only with the progressive power of the lens which, in the preferred embodiment illustrated in the Figures, constitutes the convex front surface of the lens 10. The concave back surface of the lens will be provided with a spherical or other surface that is specifically designed to adapt the lens to the particular ophthalmic prescription of the wearer.

As mentioned above, the distance and reading portions of the lens surface 12 will typically be of spherical shape, each having a specific dioptric power. The difference in power between the distance and reading portions could, for example, be from one-half diopter to three diopters or more. The specific powers of these portions of the lens are not pertinent to the present invention, except, of course, that whatever their powers, the progressive portion 18 must have a power equal to that of the distance portion 14 at its top and a power equal to that of the reading portion 16 at its bottom, and gradually change from one power to the other along its length in a continuous manner.

When a person is wearing progressive power lens, he will usually view objects through the distance, reading or progressive portions of the lens. The peripheral zones 20 of the lens 10 will also be looked through on many occasions. Therefore, it is important that effort be directed to designing the peripheral zones 20. Since, as is described above, it is not possible to design the surface of the peripheral zones 20 to be totally free of aberrations, the principal goal in designing most progressive power lenses now on the market has been to design these portions of the lens surface so as to minimize errors, or, at least, reduce the errors so that the errors do not cause discomfort to the wearer.

As a general rule, it has been found to be desirable to eliminate distortion of vertical and horizontal lines in the temporal peripheral zone 20. It is also highly desirable to minimize astigmatism in the area adjacent to the distance portion 14 and in the lowest portion of the peripheral zone 20 because these aberrations are readily noticeable when objects are viewed through a lens having these characteristics.

Figure 2A:
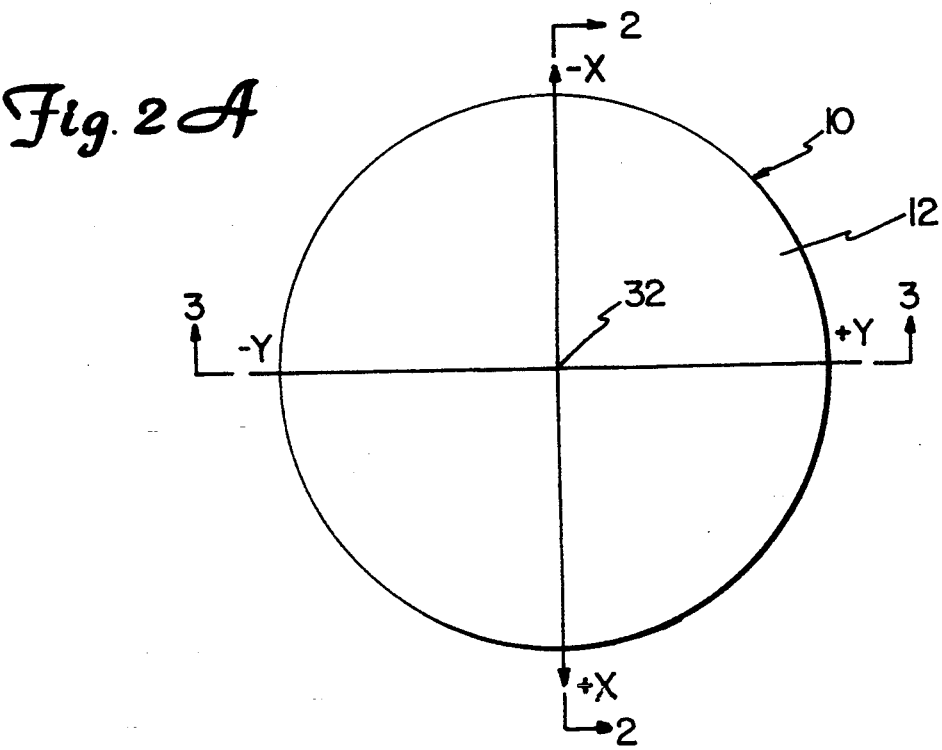
FIGS. 2A, 2B, and 2C are sectional views of the progressive lens surface according to the present invention taken in the x-y plane, the x-z plane and the y-z plane, respectively.
Figure 2B:
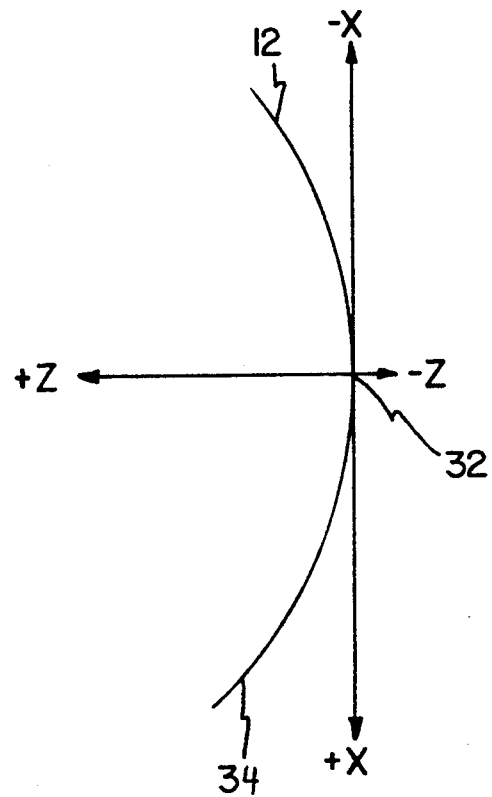
Figure 2C:
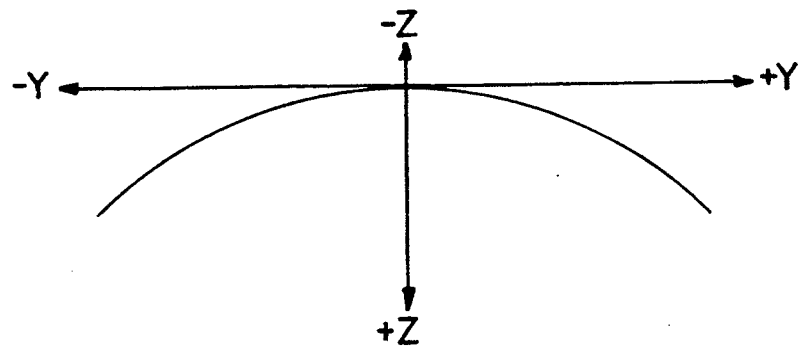

To assist in describing the present invention, a three-dimensional coordinate system has been superimposed on the progressive power lens 10 as illustrated in FIG. 2. The three-dimensional coordinate system will permit a mathematical description of the lens surface 12. FIG. 2A illustrates a front view of the lens surface. FIG. 2B illustrates a cross-sectional view of the lens surface as seen from the direction of arrows 2—2 in FIG. 2A. FIG. 2C illustrates a cross-sectional view of the lens surface as seen from the direction of arrows 3—3 in FIG. 2A. For ease of illustration, only the front progressive surface 12 of the lens is illustrated in the Figures.

With reference to FIG. 2, an origin of the coordinate system is placed at a vertex 32 of the lens surface. The vertex 32 coincides with the beginning of the top of the progressive portion of the lens surface. The x axis of the coordinate system coincides with the projection of the vertical center line 34 of the progressive portion as is more clearly illustrated in FIG. 2B. The center line 34 is also called the umbilical line and extends along the entire length of the progressive portion.

Figure 3A:
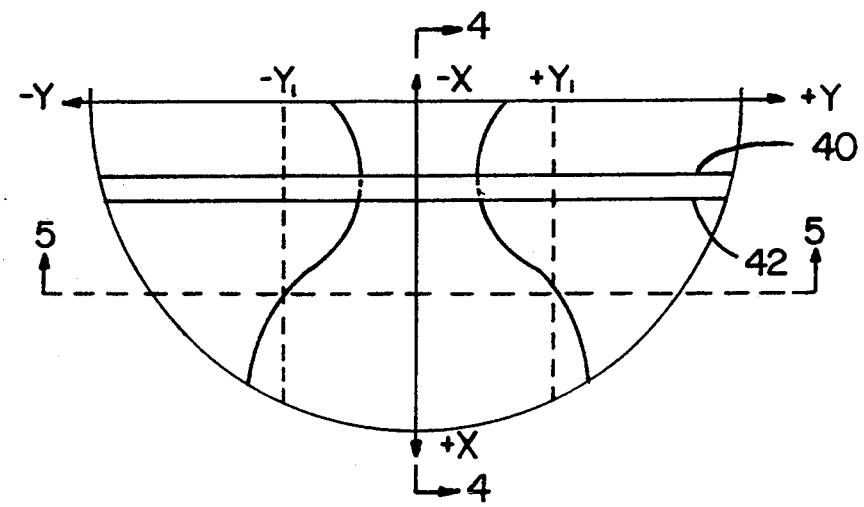
FIGS. 3A, 3B, and 3C are sectional views of a bottom half of the progressive lens surface taken in the x-y plane, the x-z plane, and the y-z planes, respectively.
Figure 3B:
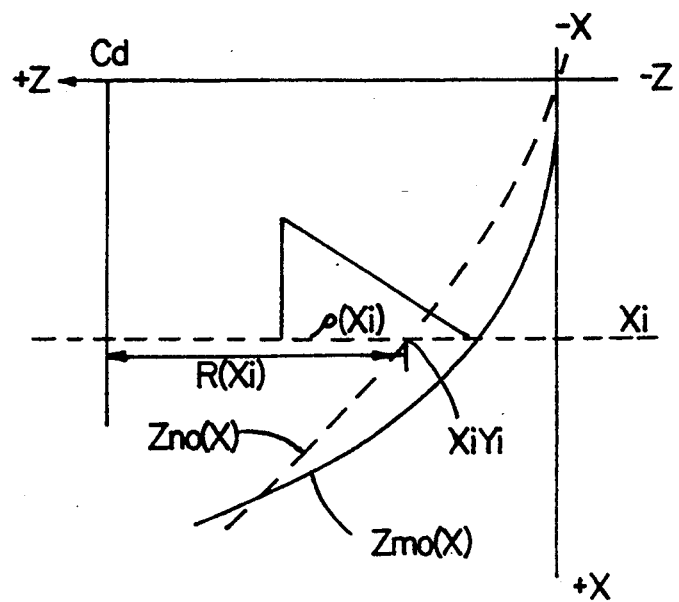
Figure 3C:
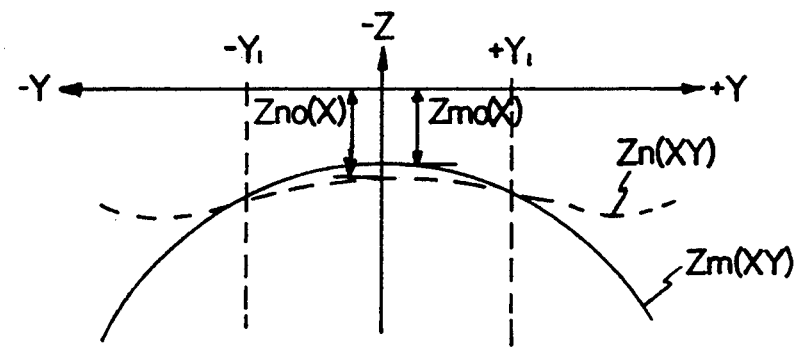

FIGS. 3A, 3B, and 3C schematically illustrate the lens 10 in the same orientations as in FIGS. 2A, 2B, and 2C, respectfully, except that for even greater ease in illustration, only the bottom half of the lens surface is shown. Specifically, FIG. 3A illustrates a front view of the lens surface. FIG. 3B illustrates a cross-sectional view as seen from the direction of arrows 4—4 in FIG. 3A. FIG. 3C illustrates a cross-sectional view as seen from the direction of arrows 5—5 in FIG. 3A. Again, for convenience of illustration, only the progressive surface 12 of the lens is shown.

The geometry of the lens surface is defined in parametric form. Specifically, each cross-section of the surface in planes parallel to the y-z plane, (e.g., planes 40 and 42 in FIG. 3A that are perpendicular to the plane of the paper and parallel to the y axis) is defined as a two-dimensional curve by an equation containing parameters of changing values as a function of the coordinate x. Further, in the bottom half of the lens, these two-dimensional curves are divided into two portions, a central portion located between coordinates $-y_1$ and $+y_1$, (FIGS. 3A and 3C) and a peripheral portion lying outside the $-y_1$ and $+y_1$ boundaries. In other words, $-y_1$ and $+y_1$ define inner boundaries of the peripheral zone 20 and, although illustrated as straight lines, the $-y_1$ and $+y_1$ boundaries can have any shape to define the inner boundaries of the peripheral zone 20.

The central portion of the curves in the bottom half of the lens (i.e., between $-y_1$ and $+y_1$ are defined by the function $Z_{m(x,y)}$ while the peripheral zone of the curves are defined by the function $Z_{n(x,y)}$. The parametric constants in both functions depend basically on the value of x.

The function $Z_{m(x,y)}$ is defined by the following equation:

$$Z_{m(x,y)} = Z_{mo(x)} + \frac{1}{B_{(x)}} ( \sqrt{ \rho_{(x)}^2 + B_{(x)}Y^2 } - \rho_{(x)}) - \frac{1}{N_{(x)}} C_{(x)} Y^{N(x)}$$

The parameters in this function are defined as follows:

$Z_{mo(x)}$ is the function that describes the geometry of the umbilical line 34 (See FIG. 3B). The shape of this curve is governed by the rate of power progression in the progressive portion and by the value of the power in the reading portion of the lens. The power function is (add $\sin^2 f_{(x)}$ where $f_{(x)}$ is any function of x that starts at 0 and ends at $\pi/2$ (preferably).

$B_{(x)}$ is a conic constant for the conic component of the function. The purpose of $B_{(x)}$ is essentially to improve the surface geometry at the transition area and the reading portion.

$\rho_{(x)}$ is the y,z component of local radius of curvature $R_{m(x)}$ of the umbilical line defined by function $Z_{mo(x)}$. (Again see FIG. 3B, which illustrates these functions for a particular cross-section curve $x_i$).

Both $C_{(x)}$ and $N_{(x)}$ are dependent to provide a smooth connection (tangent at point of intersection) of $Z_{m(x,y)}$ and $Z_{n(x,y)}$.

The peripheral curve in the bottom half and the entire curve (distance portion and peripheral zone) in the top half $Z_{n(x,y)}$ is defined by the following function:

$$Z_{n(x,y)} = Z_{no(x)} + R_{(x)} - \sqrt{ R_{(x)}^2 - Y^2 } + A_{(x)} Y^{L(x)}$$

This function defines a circle with its vertex located on curves defined by the parametric function $Z_{no(x)}$ (see FIG. 3C) modified by an exponential function.

$Z_{no(x)}$, in the bottom half of the surface is a function similar to $Z_{mo(x)}$ but has constants that control the intersection of $Z_{n(x,y)}$ and $Z_{n(x,y)}$ and therefore the width of the reading portion. In the top half of the lens, $$Z_{no(x)} = R_B - \sqrt{ R_B^2 - X^2 }$$

where $R_B$ is the base curve radius of the surface.

The term $A_{(x)} Y^{L(x)}$ greatly reduces aberrations in the lens. In the prior art designs the peripheral zone above the umbilical line was spherical. The spherical nature of the peripheral zones resulted in aberrations being experienced in these zones. Addition of the term $A_{(x)} Y^{L(x)}$ causes the peripheral zones to become aspherical. The aspherical nature of the peripheral zones allows the lens of the present invention to exhibit several advantages over the prior art designs. First, astigmatism in the lens periphery below the umbilical line is significantly reduced. Second, the maximum astigmatism of the entire lens is substantially reduced. Third, the distortion of horizontal and vertical lines is substantially reduced.

$A_{(x)}$ is small in order to suppress the contribution of this component in the central portion of the curve.

$L_{(x)}$ is selected to minimize and balance astigmatism in the lens. In the areas where Y equals approximate 18 to 23 millimeters, $Z_{n(x,y)}$ becomes a circle of the same radius and slope as the central curve at that point.

An additional exponential function $(Y-YT)^M$ may be added to the peripheral cross-sections to alter the periphery to provide a lens blank of uniform edge thickness. This function should only operate when $Y \geq YT$ and YT is sufficiently close to the lens edge so as not to distort their visually usable areas. This construction may facilitate lens manufacture, particularly injection molding.

By designing a lens in accordance with the parametric equations described above, it becomes possible to provide a lens in which peripheral distortion of horizontal and vertical lines is substantially reduced. Also, it is not necessary to provide a concentration of very strong astigmatism in narrow zones as is the practice in other designs.

Figure 4:
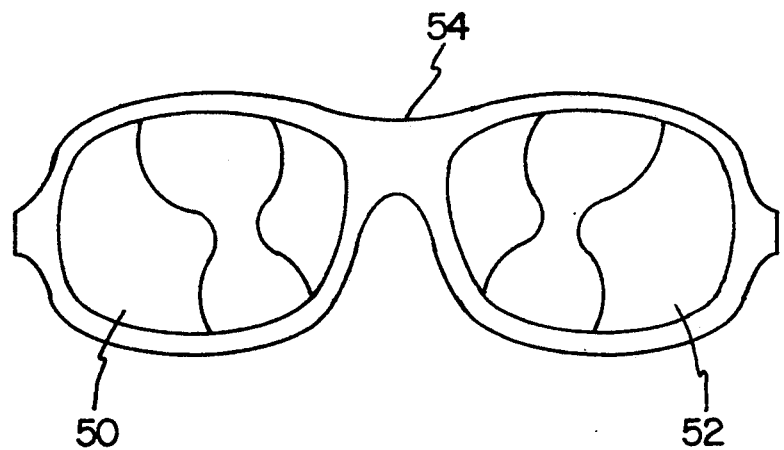
FIG. 4 is a frontal view of the progressive lens according to the present invention inserted in a pair of eyeglass frames.

An especially important feature of the present invention is that the design allows distortion of horizontal and vertical lines to be corrected in the peripheral zone even when the lens has been rotated to accommodate the lens for the right or left eye. Specifically, FIG. 4 schematically illustrates progressive lens 50 and 52 inserted in a pair of eyeglass frame fronts 54. As can be seen by the schematic representation of the progressive corridor and reading portions of the lenses, both lenses are tilted inwardly as this is necessary because of the convergence of the eyeballs when viewing near objects. Typically, the lenses are rotated 8°–10° from the vertical.

In many prior art designs, although the lens may be corrected for distortion of horizontal and vertical lines in the peripheral zone for one central orientation, it loses the correction after being rotated. The present invention provides a unique geometry that allows the correction of distortion of horizontal and vertical lines to be retained below detectable levels at the temporal peripheral zone for both left and right rotation of the lens.

The progressive lens of the present invention has been made with polycarbonate, but can also be made of allyl diglycol carbonate sold under the trademark CR-39 or from glass. If the lens is made from CR-39, the lens can be cast in a mold defined by two mold members separated from one another by an appropriate gasket, as is conventionally used to make lenses from CR-39. One of the mold members will be provided with a progressive surface on its concave surface so as to transfer that progressive surface to the convex surface of the plastic lens cast thereagainst.

The progressive mold surface can also be made in a variety of ways known in the art. Preferably, it is formed by sagging a circular piece of glass against a block of refractory material or metal that has been provided with a progressive surface by machining. The refractory block can, of course, be used many times to make molds while mold members can also be used a number of times to cast lenses.

Although the present invention has been described with reference to preferred embodiments, workers skilled in the art will recognize that changes may be made in form and detail without departing from the spirit and scope of the invention.

What is claimed is:

1. A progressively variable focal power lens comprising a progressive power lens surface having a distance portion, a reading portion, a progressive power portion, and peripheral zones, at least a portion of the surface can be defined in parametric form with reference to a three-dimensional coordinate system in which an origin of the coordinate system is at a vertex of the lens surface, the z axis is perpendicular to the lens surface at the vertex, the x axis is vertical relative to the lens surface, and the y axis is horizontal relative to the lens surface, wherein each cross-section of the portion parallel to the y-z plane is defined as a two-dimensional curve having a central portion defined by a parametric function $Z_{m(x,y)}$ and peripheral zones defined by a function $Z_{n(x,y)}$, and wherein:

$$Z_{m(x,y)} = Z_{mo(x)} + \frac{1}{B_{(x)}} (\sqrt{\rho_{(x)}^2 + B_{(x)}Y^2} - \rho_{(x)}) - \frac{1}{N_{(x)}} C_{(x)} Y^{N_{(x)}}$$

and $$Z_{n(x,y)} = Z_{no(x)} + R_{(x)} - \sqrt{R_{(x)}^2 - Y^2} \, A_{(x)} Y^{L_{(x)}}$$

where:
  $Z_{no(x)}$ is a function that describes the geometry of an umbilical line of the lens surface;
  $B_{(x)}$ is a conic constant for a conic component of the function;
  $\rho_{(x)}$ is an y-z component of local radius of curvature $R_{m(x)}$ of the umbilical line defined by the function $Z_{mo(x)}$;
  $C_{(x)}$ and $N_{(x)}$ are dependent functions that provide a smooth tangent point of intersection between $Z_{m(x,y)}$ and $Z_{n(x,y)}$;
  $Z_{no(x)}$ is a function that is similar to $Z_{mo(x)}$ in the bottom half of the lens surface but includes constants that control the intersection of $Z_{m(x,y)}$ and $Z_{n(x,y)}$ and, therefore, the width of the reading portion, in the top half of the lens, $$Z_{mo(x)} = R_B - \sqrt{R_B^2 - X^2}$$

where $R_B$ is the base curve radius of the surface;
  $R_{(x)}$ is a distance between a point $x_1 y_1$ and a line parallel to the x axis and intersecting a center of a distance portion;
  $A_{(x)} Y^{L_{(x)}}$ is a function that reduces the astigmatism in the lens periphery just below center and to reduce the maximum astigmatism;
  $A_{(x)}$ is a function that is small in order that suppresses the contribution of the $A_{(x)} Y^{Y_{(x)}}$ component in the central portion of the curve;
  $L_{(x)}$ is selected to minimize and balance astigmatism in the lens, in the areas where Y equals approximately 18 to 23 millimeters, $Z_{n(x,y)}$ becomes a circle of the same radius and slope as the central curve at that point.

2. The lens of claim 1 wherein a bottom half of the lens surface that includes the progressive zone, the reading portion, and the peripheral zone comprises a portion of the surface that is defined in the parametric form.

3. The lens of claim 1 wherein the distance portion comprises substantially a top half of the lens and where an exponential function $(Y-YT)^M$ is added to the peripheral cross-section to provide a lens blank with a uniform edge thickness, the function $(Y-YT)^M$ only operating when $Y>YT$ and YT is sufficiently close to the lens edge so that visual usable areas of the lens are not distorted.

4. The lens of claim 1 wherein the lens is constructed from allyl diglycol carbonate.

5. The lens of claim 1 wherein the lens is constructed from a polycarbonate.

6. The lens of claim 1 wherein the lens is constructed from a glass material.

* * * * *

UNITED STATES PATENT AND TRADEMARK OFFICE
CERTIFICATE OF CORRECTION

PATENT NO. : 5,446,508
DATED : August 29, 1995
INVENTOR(S) : GEORGE A. KITCHEN

It is certified that error appears in the above-indentified patent and that said Letters Patent is hereby corrected as shown below:

Col. 8, line 64, delete "$A_{(x)}Y^{Y(x)}$", and insert --$A_{(x)}Y^{L(x)}$--

Signed and Sealed this

Twelfth Day of December, 1995

*Attest:*

BRUCE LEHMAN

*Attesting Officer*   Commissioner of Patents and Trademarks